United States Patent [19]

Thompson

[11] 3,847,350

[45] Nov. 12, 1974

[54] VEHICLE HEATING UNIT

[76] Inventor: George Scott Thompson, 3457 Victoria Dr., Coquitlam, B.C., Canada

[22] Filed: Jan. 2, 1973

[21] Appl. No.: 320,321

[52] U.S. Cl. ............ 237/8 A, 236/21 B, 122/367 R
[51] Int. Cl. .............................................. F24d 3/00
[58] Field of Search ........ 122/367 C, 155 A, 367 R; 237/12, 3 C, 8 A; 236/21 B, 20, 8 A; 126/91 R, 90 R

[56] References Cited
UNITED STATES PATENTS

| 1,311,268 | 7/1919 | Gaiser | 122/367 C |
|---|---|---|---|
| 1,752,536 | 4/1930 | Mitchell | 122/234 X |
| 1,964,306 | 6/1934 | Wenger | 122/367 C X |
| 2,234,423 | 3/1941 | Wittmann | 122/367 R X |
| 2,312,479 | 3/1943 | Ray | 236/21 B |
| 2,679,831 | 6/1954 | Henkel | 122/451 R |
| 3,072,176 | 1/1963 | Sunday | 237/45 |
| 3,690,549 | 9/1972 | Hardy | 237/12.3 C |

Primary Examiner—John J. Camby
Assistant Examiner—Henry C. Yuen
Attorney, Agent, or Firm—Carver and Company

[57] ABSTRACT

A vehicle heating unit for burning inflammable gas, heat generated being transferred to vehicle through heat emitter. Unit is thermostatically controlled, is self-contained and does not require external supply of electricity. Heating unit has liquid heater tank communicating through delivery pipe with heat emitter, return pipe returning cooled liquid to tank for reheating. Temperature sensing element in liquid return pipe is connected to automatic temperature control which controls gas supply so that temperature of liquid in tank is controlled automatically by supply of gas. Optional automatic overheating control cuts gas supply when temperature of liquid exceeds predetermined maximum.

5 Claims, 4 Drawing Figures

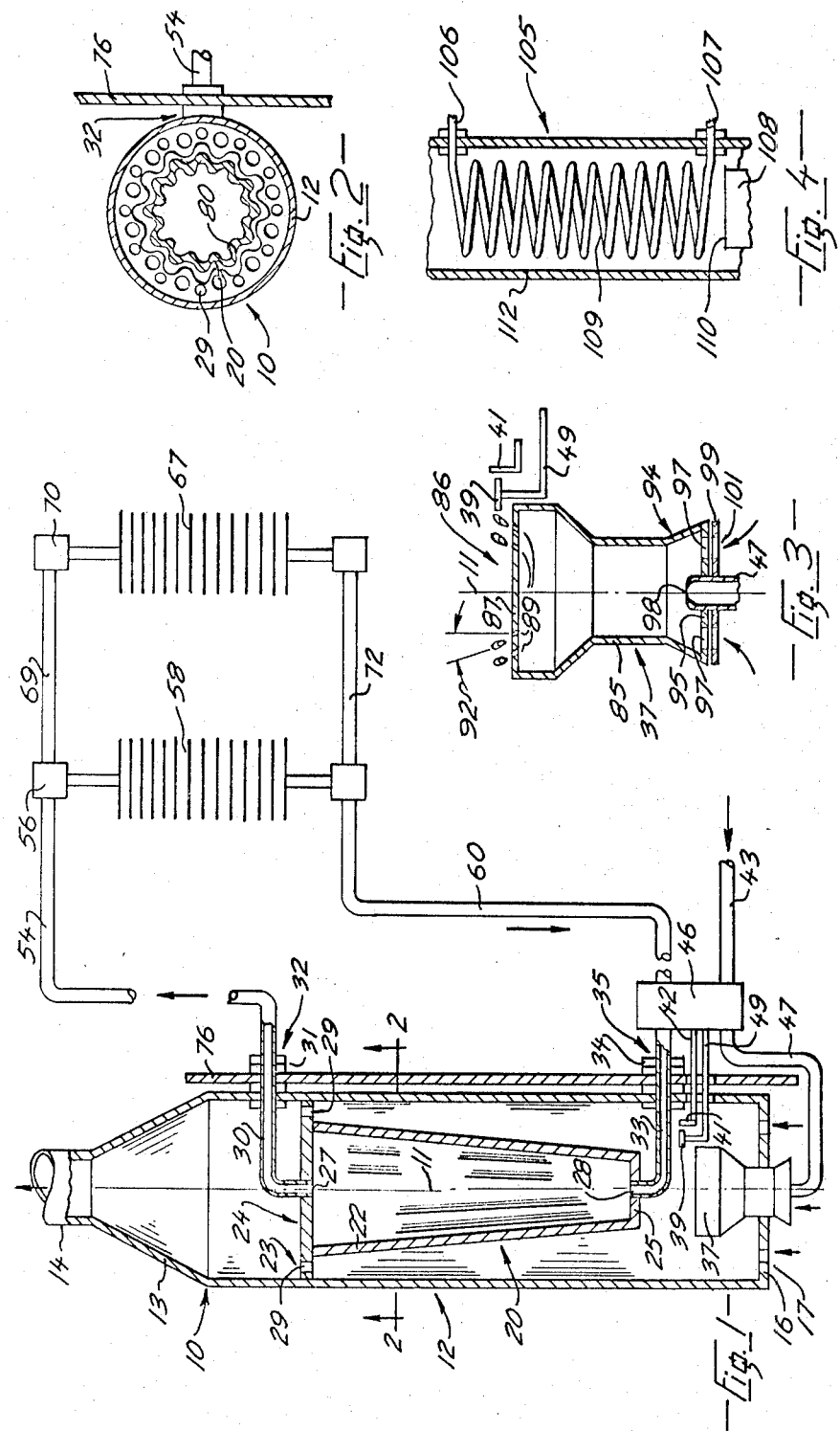

VEHICLE HEATING UNIT

BACKGROUND OF THE INVENTION

1. Field of the Invention

The invention relates to a self-contained vehicle heating unit adapted to pre-heat liquid coolant of a liquid-cooled internal combustion engine of the vehicle prior to starting the engine and/or to heat vehicle interior, the unit being operable without an external electrical supply.

2. Prior Art

Vehicle engine pre-heating units are known, and are used in cold conditions for pre-heating engine coolant before starting the engine. Whilst such units are adequate for some purposes, many require a source of electrical power to actuate valves, igniters, fans etc., in a pre-heater electrical circuit, which power is supplied from either mains alternating current (A.C.) or from the car battery. If the vehicle is to be used in the wilderness, mains A.C. power is not available and thus pre-heating units requiring mains power cannot be used. It is well known that output voltage of a standard lead/acid car battery decreases, and when battery temperature approaches 0°F output voltage from such a battery, for most practical purposes, is negligible. Thus at such temperatures pre-heater units requiring the car battery for operation become inoperative and therefore can be used only when the battery is warmed sufficiently to generate adequate voltage for actuating the pre-heater circuit. This could be a difficult task in a frozen wilderness.

Many prior art heating units are not thermostatically controlled and thus require manual surveillance of the heating unit during operation to reduce risk of overheating, which can occur if there is restricted circulation of engine coolant. Also, such heating units are for heating the engine block only, and to heat the vehicle interior the engine has to be started to operate the vehicle interior heater. Thus to warm a stationary vehicle interior, the engine must be running, or a separate interior heater is required.

SUMMARY OF THE INVENTION

The invention reduces difficulties of prior art heating units by providing a vehicle heating unit which is independent of an electrical power source and can be started with a lighted match. Heat output from the heating unit is thermostatically controlled by a conventional automatic temperature control unit, which can also protect the heating unit against overheating. The unit is particularly adapted to heat engine coolant but can also heat a vehicle interior, and thus the vehicle can be heated without the engine operating.

One embodiment of the vehicle heating unit burns a compressed inflammable gas from a supply, heat generated being transferred to the vehicle through a heat emitter. The heating unit includes a liquid heater tank having an outlet port communicating with a delivery pipe which conducts the heated liquid to the heat emitter, and an inlet port communicating with a liquid return pipe to receive cooled liquid from the heat emitter. An automatic temperature control unit has a temperature sensing element in the liquid return pipe to control gas to a gas burner which heats the liquid. The burner has a main jet and a pilot jet, gas supply to the main jet being controlled by the temperature control unit. Thus gas delivery is responsive to cooled liquid temperature. The control unit can have an automatic over-heating control having a shut-off valve in the gas supply line. The shut-off valve closes gas supply to both the main and pilot jet when temperature of liquid in the return pipe exceeds a pre-determined maximum and the gas supply can only be re-established by actuating a manual override switch.

A detailed description following related to drawings, describes embodiments of the invention which, however, is capable of expression in structure other than that particularly described and illustrated.

DESCRIPTION OF THE DRAWINGS

FIG. 1 is a simplified fragmented sectional side elevation of a portion of the heating unit, some portions not shown in section and other portions omitted, FIG. 2 is a simplified fragmented section on 2—2 of FIG. 1, FIG. 3 is a simplified fragmented section of a gas burner according to the invention, FIG. 4 is a simplified fragmented section of a portion of an alternative heating unit.

DETAILED DISCLOSURE

FIG. 1

A vehicle heating unit 10 according to the invention has a heater chamber 12 having a central longitudinal axis 11, an upper end 13 communicating with a flue 14, and a lower end 16 having openings 17 to admit air. A heater tank 20 has an inverted conical sidewall 22 closed by top and bottom end pieces 24 and 25, the end pieces having outlet and inlet openings 27 and 28 respectively. An upwardly tapering annular space is provided between the conical side wall and the heater chamber. The top end piece 24 of the tank extends beyond the side wall forming an annular portion 23 surrounding the tank. The portion 23 has a periphery secured to an inner side wall of the chamber 12 to support the tank, and has a plurality of vents 29 to pass gasses. The tank contains a liquid to be heated, the liquid being compatible with conventional engine coolant, and containing additives to depress freezing point, as in common antifreeze.

An outlet pipe 30 extends from the opening 27 to a union 31 at an outlet port 32 of the heater unit. An inlet pipe 33 communicates with the opening 28 and has a union 34 at an inlet port 35 of the heater unit. A gas burner 37, to be described with reference to FIG. 3, heats liquid in the tanks 20 and has a main jet (FIG. 3) and a pilot jet 39, the pilot jet when lit providing a pilot light for ignition of the main jet and to heat a thermocouple 41. The thermocouple 41 is connected by a conductor 42 to an automatic temperature control unit 46. A gas supply line 43 supplies gas to the control unit 46, which unit has a valve (not shown) which regulates gas through a main jet delivery line 47 which feeds gas to the burner 37. The unit 46 supplies gas to the pilot jet 39 through a pilot jet delivery line 49, which jet is supplied with gas continuously during normal heater operation as will be described.

The outlet port 32 of the heater unit communicates with a delivery pipe 54 to conduct heated liquid to a bleed valve union 56 which can bleed air from the system if required, and also serves to couple a heat emitter or heat sink 58 to the delivery pipe. The heating unit operates on a thermo-siphon principle and thus the heater tank 20 is positioned below the heat emitter so as to take advantage of density changes of the heated liquid, which changes induce circulation in the heating liquid. The bleed valve may be required in instances after filling the system with liquid after servicing, etc., and serves as an expansion chamber. The heat emitter 58 is a heat exchanger fitted to a portion of the vehicle to be heated, or serves as a heat sink, and heat is transferred through the emitter, thus cooling the liquid. The cooled liquid returns to the heater through a liquid return pipe 60 which communicates with the inlet port 35 at the union 34. A temperature sensing element (not shown) is provided in the liquid return pipe 60 and is part of the automatic temperature control unit 46.

The heat emitter 58 can be a liquid/liquid heat exchanger immersed in the liquid coolant of the engine block, so as to heat the coolant prior to starting, or it can be a liquid/air heat exchanger in the vehicle interior. Alternatively, for heating the engine block, the heat exchanger is omitted and the pipes 54 and 60 are connected to suitable upper and lower liquid unions in the engine block and coolant thus serving as a heat sink. Care is taken to select the unions to reduce short circuiting of liquid or local hot spots. If both the engine block and the vehicle interior are to be heated, a second heat emitter 67 can be provided where required. A second delivery pipe 69, through a bleed valve unit 70, connects the heat emitter in parallel as shown, and a second return pipe 72 communicates with the return pipe 60 to feed the cooled liquid back to the heating unit. Clearly the heat emitters can be arranged in series if required, well known design parameters determining heat capacity, flow requirements for each arrangement, and relative positions of the heat emitters and heater tank, plus fitting of expansion chamber as required.

The heating unit is usually secured outside the vehicle interior for safety, for example to a bulk-head 76 adjacent the engine. The pipes 54 and 60 lead from the heater unit into the interior to the heat emitter, and thus the heater chamber 12 is not a hazard inside the vehicle, and can be easily removed from outside the vehicle. Draining of the circuit is easy as liquid will drain by gravity. An opening (not shown) in the heater chamber is provided near the pilot jet 39 to permit easy lighting of the pilot jet to start the heating unit, for example by a lighted match inserted through the opening.

As previously stated, the automatic temperature control unit 46 receives gas through the line 43 from the gas supply, such as a tank containing compressed butane or equivalent (not shown). The control unit 46 supplies gas to the pilot jet 39 through the pilot jet delivery line 49, which jet provides a pilot flame to heat the thermocouple 41. The thermocouple 41 generates electrical voltage when heated, which voltage produces an electrical current which is conducted through the conductor 42 to the control unit 46. The unit 46 responds to feedback from the temperature sensing element and supplies gas to the main burner so as to maintain liquid temperature between high and low temperature limits. A suitable unit 46 is supplied by the Honeywell Corporation of Minneapolis, Minn., U.S.A., under a basic part number V5130, which unit has valves (not shown) to close the gas line to the main jet and the pilot jet if the pilot 39 is extinguished. Means to regulate gas pressure from the gas tank can be provided at the gas tank, or in the control unit. The control unit 46 is within a casing which embraces the liquid return pipe 60 and the gas supply line 43 as shown so as to provide a compact unit which can be easily fitted to the vehicle.

If required an energy cut-off device can be provided in the unit 46 so that if a predetermined maximum temperature, e.g., 210°F, is exceeded, that is if the heater tank overheats, the control unit cuts the supply of gas both to the main burner and the pilot jet. This would arise in an overheating condition, which could be dangerous to occupants or may possibly damage the heating unit. A manual override switch (not shown) is provided on the unit 46 for relighting the pilot flame when the cause of overheating is located and corrected.

FIG. 2

The side wall 22 of the heater tank 20 is corrugated as shown, the corrugations increasing surface area so as to improve heat transfer. The corrugations form essentially vertical flutes, one designated 80 extending between the bottom and top end pieces. The vents 29 are spaced peripherally around the annular portion 23 and are positioned as shown so as to induce currents of hot gas to pass close to the side walls.

FIG. 3

The burner 37 has a body portion 85 which has an upper end 86 having a generally horizontal circular burner face 87. The face 87 has a plurality of holes, four such holes being designated 89, the holes serving as jets to pass a gas/air mixture for burning above the face 87. The holes are disposed on a pair of concentric circles centered on the face 87 and disposed directly beneath the lower end 25 of the tank 20, concentric with central axis 11. The holes are drilled so as to be inclined at an angle 92 to the vertical, so that gas/air mixture passing through the holes is inclined away from the vertical so as to produce a pair of concentric truncated conical zones of combustion on circles having diameters approximately equal to the lower end 25 of the tank 20.

The body portion 85 has a lower end 94 having a lower face 95 provided with a plurality of openings disposed on a circle centered on the axis 11, two such openings being designated 97. The main jet delivery line 47 terminates at an orifice 98 on the axis 11 and is thus surrounded by the openings 97. A circular disc 99 is journalled for rotation about the line 47, and has a plurality of similar openings 101 which are adapted to be brought into register with the openings 97 when the disc is in a particular position. Rotation of the disc brings the openings out of register and effectively reduces air openings, thus restricting air flow through the lower end of the burner. The openings 97 on the lower face and the disc 99 with openings 101 serve as a variable air intake for admitting air into the burner body, thus changing gas/air ratio to control combustion.

The pilot jet delivery line 49 carries the pilot jet 39 at an upper end thereof, which jet directs the pilot flame (not shown) onto the thermocouple 41 and also initiates burning of gas from the main jet. Gas flowing through the main jet 47 draws air through the openings 97 and 101 in an amount proportional to degree of register between the openings, thus providing a combustible gas/air mixture to pass through the holes 89.

OPERATION

Before lighting the heater liquid expansion allowance is provided, for example by opening a radiator cap and/or by opening a bleed valve. The heater is lit by opening a valve (not shown) from the gas supply and depressing the pilot start button (not shown) on the temperature control 46, to override an automatic valve which is normally closed when the thermocouple is cold. A lighted match is inserted through the heater chamber opening to light the pilot jet, the button being depressed until the pilot flame remains lit when the button is released, as in a common automatic control. If the temperature in the return pipe 60 is less than minimum temperature set by the unit 46, which is normally the case for a cold heater, the unit 46 opens the main jet delivery line 47 and the burner 37 ignites and starts to heat liquid within the tank 20. Heating of the liquid produces convection currents within the tank which produces the thermo-syphon circulation through a circuit formed by the delivery pipe 54, the heat emitters 58 and also 67 if the respective valve is open, and back through the return pipe 60 to the tank. The main jet continues to burn until temperature in the return pipe 60, as detected by the temperature sensing element reaches a predetermined maximum at which time the unit 46 cuts off gas to the main jet, which is extinguished, the pilot light remaining burning. Residual thermo-syphon effect maintains a diminishing circulation in the circuit until the temperature of the liquid in the return line 60 drops to a minimum as set by the unit 46. When the minimum is reached, the unit control 46 readmits gas to the burner 37 which reignites and reheats the liquid in the tank 20.

If, for some reason, such as a blockage in one of the pipes, the thermo-syphon circulation is restricted, temperature of the heated liquid in the tank increases beyond the predetermined maximum and the temperature sensing element thus reaches the maximum. The energy cut-off device automatically closes gas supply both to the main jet and the pilot jet, thus extinguishing the burner completely. The pilot jet can be relit only by pressing the manual reset button (not shown). Other known overheating devices can be incorporated in the tank 20.

FIG. 4

An alternative heater 105 has outlet and inlet ports 106 and 107 provided at opposite ends of a heating coil 109. The heating coil is provided in an alternative heater chamber 112 and it is adapted to receive heat from a gas burner 108, only a portion of which burner is shown. The coil 109 is an alternative to the tank 20 of FIG. 1 and, if made of copper or aluminum, is an efficient means of transferring heat from the burner 108 to the liquid in the coil. The burner 108 is similar to the burner 37, having an upper face 110 with a plurality of inclined holes (not shown) disposed in two circles centered on a vertical longitudinal axis of the heater. One of the circles has a diameter slightly smaller than the coil diameter and the other circle has a diameter slightly greater than the coil diameter. Thus the two concentric truncated conical zones of heat produced by the burner effectively straddle the coil, producing effective heat exchange between the coil and the burning gas.

I claim:

1. A self-contained heating unit for heating a vehicle independently of external electrical power, the unit being adapted to burn a compressed inflammable gas from a pressurized gas supply, heat generated by burning being transferred to the vehicle through a heat emitter in the vehicle, the heating unit including:

a. a cylindrical heater chamber having a upper end having a flue, and a lower end having openings to admit air, the chamber being adapted to be secured vertically to a vehicle body portion,
   b. a heater tank to heat liquid, the tank having inlet and outlet ports and being disposed generally centrally within the heater chamber,
   c. a liquid delivery pipe communicating with the outlet port and the heat emitter to conduct heated liquid from the tank to the heat emitter,
   d. a liquid return pipe communicating with the inlet port and the heat emitter so that the tank receives cooled liquid from the heat emitter, the heater tank, the pipes and the heat emitter thus forming a closed loop, the heater tank being disposed below the heat emitter so that heated liquid produces a thermo-syphon circulation in the closed loop, the unit further including:

e. a gas burner adapted to heat the liquid in the tank, the burner having a main jet and a pilot jet the jets being positioned closely together, the burner being positioned beneath the heater tank so that the pilot jet is adjacent an opening at the lower end of the heater chamber to facilitate lighting of the pilot jet, f. a main jet delivery line feeding gas to the main jet,
   g. a pilot jet delivery line feeding gas to the pilot jet,
   h. a gas supply line extending from the gas supply, a manual valve cooperating with the supply line to control gas flow from the supply,
   i. an automatic temperature control unit having: an intake connected to the gas supply line to receive gas; a temperature sensing element in the liquid return pipe; a cut-off valve to control entry of gas into the control unit from the gas supply; gas outlets communicating with the main jet delivery line and the pilot jet delivery line respectively, the outlets being controlled by respective valves; a thermocouple adjacent the pilot jet to be heated by the pilot jet, the thermo couple providing electric power to actuate the valves controlling the gas supply to the pilot jet and to the main jet; so that should the pilot light become extinguished when the main jet is not lit the gas supply to both jets is stopped, and if the temperature sensing device indicates excessively high liquid temperature in the return pipe the gas supply to both jets is stopped, the automatic temperature control unit further including: a casing enclosing the valves aforesaid, the casing embracing the return pipe and the gas supply line so as to provide a compact unit which can be easily fitted to a vehicle and coupled to a heat emitter to provide heating of the vehicle, without the use of an external electrical power source, thus permitting operation of the device at temperatures when normal vehicle storage batteries are inoperative.

2. A heater as claimed in claim 1 in which:

i. the tank has an inverted conical side wall so that an upwardly tapering annular space is provided between the conical side wall and the heater chamber,
   ii. top and bottom end pieces close the side wall, the end pieces having outlet and inlet openings serving as outlet and inlet ports respectively and communicating with the liquid delivery and return pipes of the heater unit.

3. A heater as claimed in claim 2 in which
ii. the top end piece of the tank extends beyond the side wall forming an annular portion surrounding the tank, the annular portion having a periphery secured to an inner side wall of the heater chamber to support the tank, the annular portion being provided with vents to pass burned gases.

4. A vehicle heater as claimed in claim 2 in which:
i. the tank is enclosed within a heater chamber, the tank having a heating coil communicating with the outlet and inlet ports.

5. A vehicle heating unit as claimed in claim 2 wherein
i. the side wall of the tank is corrugated to form flutes extending from the bottom end piece to the top end piece.

* * * * *